United States Patent [19]

Hashimoto

[11] Patent Number: 4,797,912

[45] Date of Patent: Jan. 10, 1989

[54] TELEPHONE ANSWERING DEVICE HAVING PUSHBUTTON CONTROLLED STANDBY MODE

[75] Inventor: Kazuo Hashimoto, Tokyo, Japan

[73] Assignee: Hashimoto Corporation, Tokyo, Japan

[21] Appl. No.: 682,856

[22] Filed: Dec. 18, 1984

[30] Foreign Application Priority Data

Dec. 21, 1983 [JP] Japan ................. 58-241706

[51] Int. Cl.$^4$ ............................................. H04M 1/65
[52] U.S. Cl. ......................................................... 379/79
[58] Field of Search ................. 379/70, 74, 76, 77, 379/83

[56] References Cited

U.S. PATENT DOCUMENTS

| | | | |
|---|---|---|---|
| 2,761,899 | 9/1956 | Keith et al. | 379/83 |
| 4,164,663 | 8/1979 | Hashimoto | 379/74 |
| 4,230,909 | 10/1980 | Baum | 379/76 |
| 4,306,117 | 12/1981 | Jacobson | 379/76 |
| 4,469,919 | 9/1984 | Nakamura et al. | 379/77 |
| 4,558,179 | 12/1985 | Bond | 379/70 |

Primary Examiner—Alan Faber
Assistant Examiner—James E. Tomassini
Attorney, Agent, or Firm—Lowe, Price, LeBlanc, Becker & Shur

[57] ABSTRACT

An automatic telephone answering and recording device is capable of selecting, in accordance with a length of time for pushing an "absent" button, either the case where the device operates automatically after a first or a second incoming ringing signal or the case where the device does not constitute the closed circuit of a telephone line while an answer tape is driven, by one round, for confirmation and the device merely returns a ringing back tone to a calling party. Also, the device adopts a control system controlled by the program stored in a microcomputer thereby to distinguish two cases each of which is formed dependent on a length of time for pushing the "absent" button, respectively.

7 Claims, 4 Drawing Sheets

TELEPHONE ANSWERING DEVICE HAVING PUSHBUTTON CONTROLLED STANDBY MODE

BACKGROUND OF THE INVENTION

This invention relates to an automatic telephone answering and recording device.

Conventionally, there has been provided an automatic telephone recording device which enables an automatic telephone answering device to be on standby whereby, upon receipt of the calling signal from a calling party, the device automatically picks up the calling signal to form a closed engaging circuit, sends out previously recorded outgoing messages to the calling party and records the voice of the calling party, and whereby, after the subscriber returns home, the device is operated to manually reproduce a tape so as to hear the incoming messages from a calling party and then is set to be on standby again. In such a conventional device, it is necessary to push an "absent" button at first, as a result of which an outgoing message tape generally returns once and also a voice is reproduced from the speaker. Accordingly, the setting of a new standby state is effected by confirming the outgoing messages and setting the tape to its initial position upon the completion of the outgoing messages. Therefore, in case of a power failure or power on, it is impossible to cause the telephone answering device to be placed on standby during the ringing once or twice as a result of a calling signal from a calling party, to enable it to be operated by the incoming calling signal and to instantly send out outgoing messages.

In other words, since such a device is so organized as to, at first, send out outgoing messages upon pushing an "absent" button and to set the tape to its initial position upon the completion of the outgoing messages thereby to cause the automatic telephone answering device to be on standby, almost several tens of seconds elapse during which the bell of the telephone continues to ring. As a result, any called party tends to take his handset off hook to prevent undesired ringing and to prevent feeling obliged to answer. This makes the automatic telephone answering device useless, even though it is well-equipped.

SUMMARY OF THE INVENTION

The present invention relates to an improvement of a conventional automatic telephone answering and recording device which operates to remove aforementioned disadvantages in the operation thereof.

A first object of the present invention is to provide an automatic telephone answering device which is so organized as to instantly be placed into a standby state in response to the ringing signal by pushing an "absent" button.

A second object of the present invention is to provide an automatic telephone answering device which is capable of selecting, in accordance with a length of time for pushing an "absent" button, either the case where the device operates automatically with a first or a second incoming ringing signal or the case where the device merely returns a ringing back tone to a calling party while an outgoing message tape is rotated, by one round, for confirmation and does not constitute the closed circuit of a telephone line.

A third object of the present invention is to provide an automatic telephone answering device which is organized so as not to operate to effect aforementioned selection when a power source is initially applied.

A fourth object of the present invention is to provide an automatic telephone answering device which adopts a control system controlled by a program stored in a micro-computer thereby to distinguish between a case wherein an "absent" button is pushed for more than a predetermined time with a case where it is pushed for less time by means of programming control. This control system is useful to attain such objects as mentioned above.

The foregoing objects, other objects, specific features and effects of the present invention will become more apparent from the following detailed descriptions and the appended claims when read in conjunction with the accompanying drawings.

DETAILED DESCRIPTION OF THE INVENTION

Figure 1:
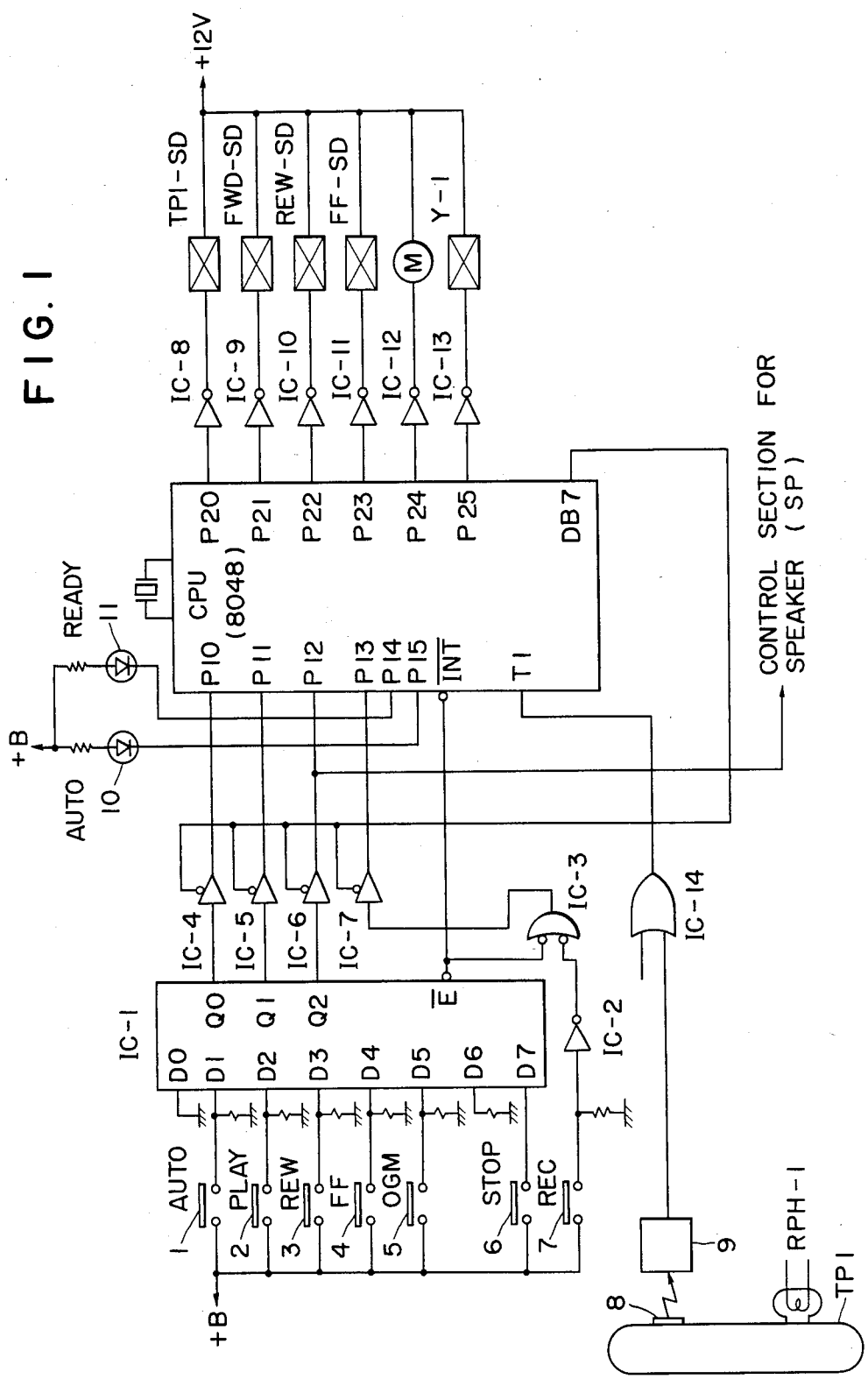
FIG. 1 is a diagram showing the operating principle of a first example of the present invention.

Referring to FIG. 1, a keyboard is provided with keys 1 to 7 in which 1 represents a key for setting the automatic telephone recording device to be automatically operated, 2 a key for setting a receiving tape TP-2 (not shown) to be reproduced (PLAY), 3 a key for setting the receiving tape TP-2 to be rewound (REW), 4 a key for setting the receiving tape TP-2 to be fast forwarded (FF), 5 a key for setting an answer tape TP-1 to be reproduced (OGM), 6 a key for stopping the operation of the device (STOP), and 7 a key which, when it is pushed together with the key 5, sets the answer tape TP-1 to be on a position for recording answer messages by means of a microphone (not shown) and when it is pushed together with the key 2, sets the answer tape TP-1 to be in a position for recording a mutual conversation by means of the microphone or a telephone line.

An integrated circuit IC-1 is a decoder for converting an input from the keyboard into three bits of a digital number, IC-2 an inverter, IC-3 a NAND gate, IC-4 to IC-7 elements for constituting a three state buffer, IC-8 to IC-13 drivers and IC-14 an OR gate. In the example, a microprocessor, type-8048 is used as a CPU. Also, there is provided a conductor foil 8 adhered on the starting point of the answer tape TP-1. When the conductor foil 8 is detected, a signal "1" is outputted from a starting point detecting circuit 9. When the key 1 is pushed, an electroluminescent diode 10 lights up, and when the key 1 is pushed and also the device is set to be completely on standby, another electroluminescent diode 11 lights up. Furthermore, TP-1-SD is a solenoid for switching the driving mechanism of the device into the side of the answer tape TP-1, FWD-SD a solenoid for normally forwardly driving (FORWARD) both the answer tape TP-1 and the receiving tape TP-2 (not shown), REW-SD a solenoid for returning the receiving tape TP-2, FF-SD a fast forwarding solenoid, M a direct current motor, and Y-1 a relay for making loops of the telephone lines. As is apparent from FIG. 1, there are shown circuits which have direct relationship with the present invention, other circuits, for example, a detecting circuit for detecting the receipt of signals, a closing circuit, etc. being omitted.

The operation of the device according to the present invention will be explained in detail referring to the flow charts shown in FIG. 2 and FIG. 3

Figure 2:
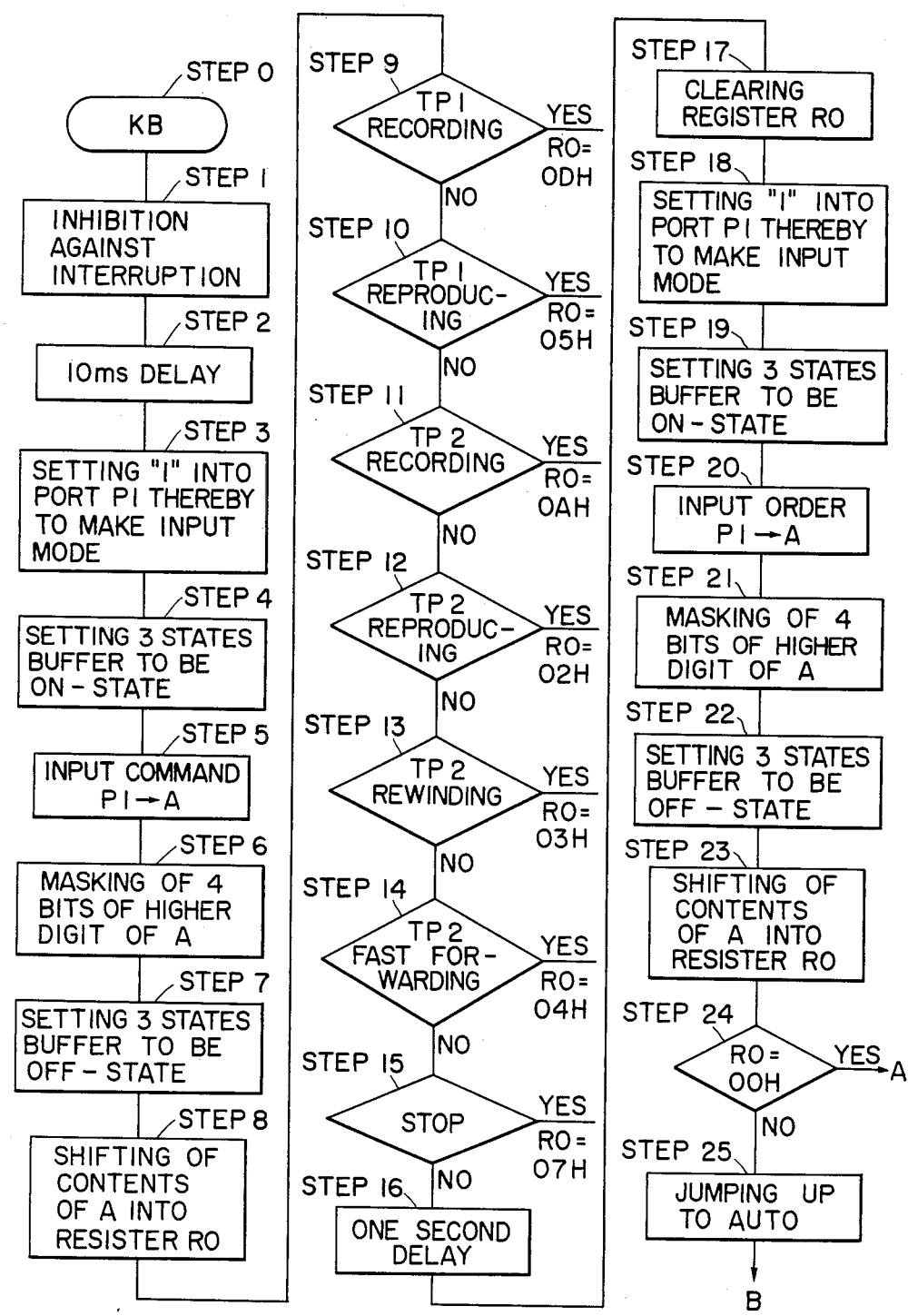
FIG. 2 is one portion of a flow chart showing the operation of the example shown in FIG. 1.
Figure 3:
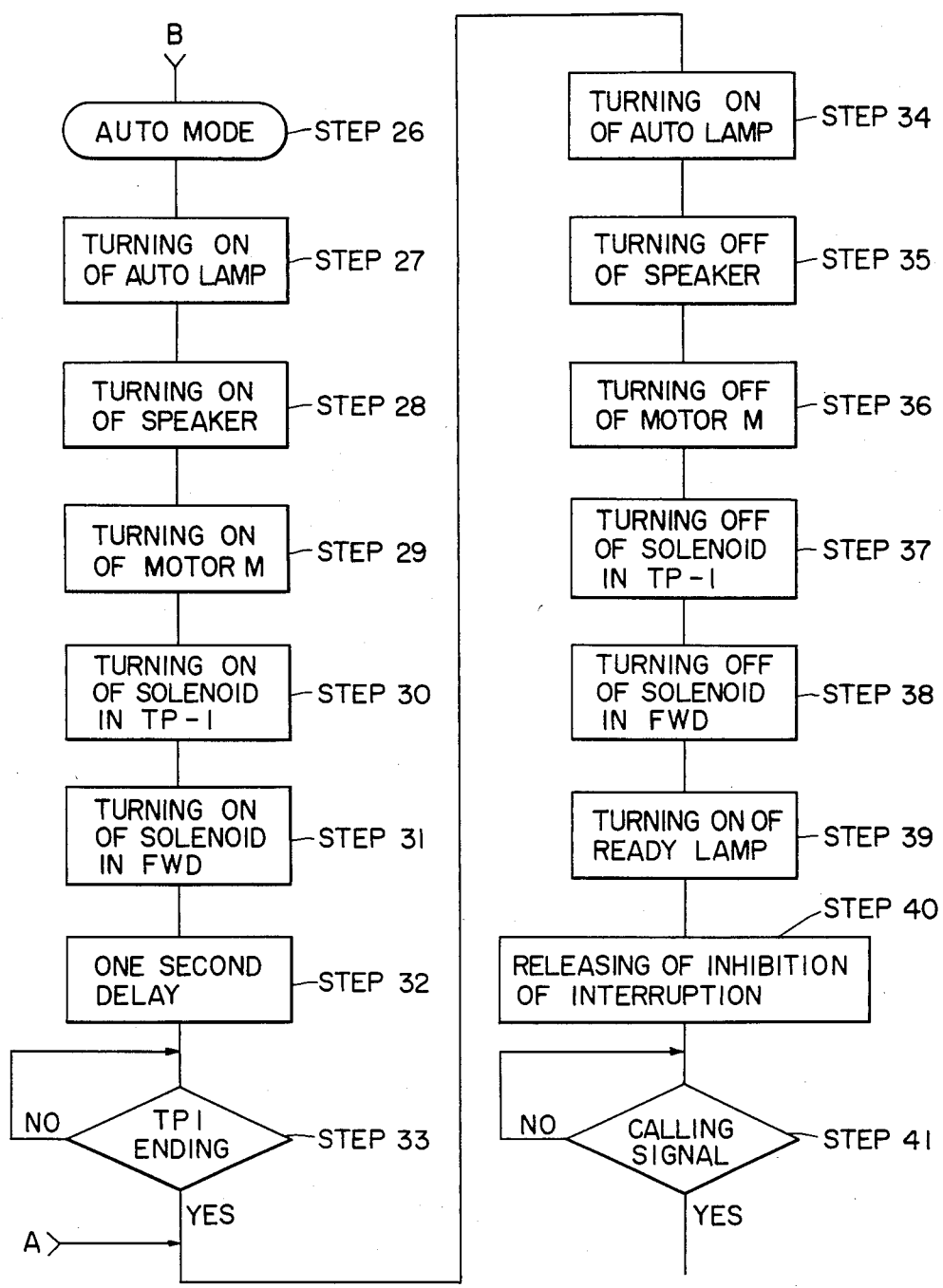
FIG. 3 is another portion of the flow chart shown in FIG. 2.

First of all, if any of keys 1 to 6 is pushed, the predetermined routine being executed is interrupted KB of the STEP0 in the flow chart in FIG. 2. In other words, when any of input terminals D1 to D7 of the decoder IC-1 changes from "0" to "1", a terminal $\overline{E}$ switches from "1" to "0", and the thus obtained output causes the CPU to be interrupted through the terminal INT of the CPU. A STEP1 operates to apply the interruption and to prevent the state from returning to the STEP0 before a specified operation which is effected since the interruption. Subsequently, in the STEP2, 10 ms of delay is given thereby to prevent error operations due to the chattering of the keys. In the STEP3, setting of the digit "1" to each bit of a port P1 (In FIG. 1, ports P10 to P15 are shown, while ports P16 and P17 which have no relationship with the present invention are omitted.) enables the port P1 to be on an inputting mode. In the STEP4, when DB7 which is one bit of a data bus is set from the digit "1" to "0" thereby to turn on the three states buffer composed of IC-4 to IC-7, a binary number output of the decoder IC-1 due to pushing the key is added to the port P13, and also when the recording key 7 is simultaneously pushed, the output of the NAND gate IC-3 is further added to the port P13. In the STEP5, an input order causes codes in the ports P10 to P15 to be inputted in an accumulator A of the CPU. In the STEP6, since only the four bits of the lower digit relating to ports P10 to P13 are necessary among the codes which have been inputted in the accumulator A, unnecessary four bits of the upper digit are masked. In the STEP7, as the codes from the keyboard have already been inputted, the above mentioned DB7 is returned to the digit "1" and also the three states buffer composed of IC-4 to IC-7 is turned off. In the STEP8, the codes in the accumulator A are temporarily stored in, for example, a register R0 of the CPU. Also, in the STEP9 to STEP15, the codes stored in each of them are compared and this comparison is utilized to check which of the keys is pushed. For example, in the case where the PLAY key 2 of the receiving tape TP-2 is pushed at the side of the device, the codes of outputs Q2, Q1, Q0 of the decoder IC-1 are represented by bit [010] and are also represented by bit [02H] according to hexadecimal notation. Accordingly, when these codes are stored in the register R0 and the coincidence of these codes is obtained in accordance with comparison, it is jumped into a reproducing routine of the receiving tape TP-2. As the reproducing routine itself, however, has no direct relationship with the present invention, the descriptions thereof are omitted herein.

Hereinafter, explanations will be made on the different two cases where the key (AUTO) 1 is pushed. Firstly, in the case where the key 1 is pushed for more than one second, it passes STEP9 to STEP15 mentioned above and directly goes to STEP16, where a delay time is given by one second.

After the provision of this delay time, the register R0 is once cleared in STEP17. This clearing is effected by reason that if, before the key 1 is pushed, the codes inputted by other keys are stored in the register R0 as they are, such program as will be explained hereinafter does not normally function. In STEP18, the port P1 is set again to be on an input mode, as in STEP3 mentioned above. In STEP20, the codes added to the port P1 by the input order are inputted to the accumulator A, as in STEP5. In STEP21, the four bits of the higher digit of the accumulator A are masked, as in STEP6. In STEP22, the three states buffer composed of IC-4 to IC-7 is turned off, as in STEP7, and in STEP23, the codes of the accumulator A are stored in the register R0, as in STEP8. Thereafter, in STEP24, a test for checking whether or not the codes in the register R0 equal to [00H] is effected. Namely, provided that the key 1 continues to be pushed for more than one second of delay time in STEP16 and also the codes of the key 1 are inputted to the accumulator A in STEP20, the codes of the register R0 become equal to [00H] in STEP24 and consequently it goes to STEP25, where it goes to an "AUTO" mode of STEP26 shown in FIG. 3. In STEP27, the port P1 is switched to an output mode, the terminal P15 is set to "0", and thus the electroluminescent diode 10 in the "AUTO" mode lightens up. In STEP28, the speaker (SP) which is not shown in FIG. 1 is caused to be in an on-state by setting a terminal P24 to "1". In STEP29, the motor M is powered on by setting the terminal P24 to "1". Also, in STEP30, the setting of the terminal P20 to "1" enables the solenoid TP1 SD to be turned on, and in STEP31 the turning-on of the solenoid FWD·SD enables the answer tape TP-1 to be operated thereby to output sound signals from the speaker through an amplifier not shown in Figures. After one second of delay time is given in STEP32, a tape ending test for checking whether or not the answer tape TP-1 actually rotates by one round is effected in STEP33. When the answer tape TP-1 has completed one round, a test terminal T1 is raised up to "1" through the conductor foil 8, the starting point detection circuit 9 and the OR gate IC-14. After this state is detected by a program, it goes to STEP34, where the same operation as in STEP27 is effected on the basis of a program which will be explained later. Furthermore, as is apparent from the foregoing, the speaker is cut off in STEP35 to STEP38 and the answer tape TP-1 is caused to be stopped. Then, in STEP39, the switching of the terminal P14 from "1" to "0" causes an electroluminescent diode 11 for "READY" to be lightened thereby to show that the device is set to be on standby. In STEP40, the order for inhibiting the interruption given in STEP1 is removed, and in STEP41 the test of calling signals is effected. In addition, an operation after the receipt of calling signals is omitted herein, because it has nothing to do with the present invention.

Secondly, the explanation will be made on the case where the key (AUTO) 1 is pushed for less than one second. In other words, in the case where the finger is caused to be detached from the key 1 before one second of delay time in STEP16 elapses, the code of the key 1 is distiguished within one second of the delay time. Accordingly, the codes inputted in the accumulator A according to the input order in STEP20 become [00H]. Since, in the test of STEP24, the coincidence of codes makes it go to STEP34 through the arrow A, it is clear that the answer tape TP-1 does not run and is instantly set to be on standby.

Figure 4:
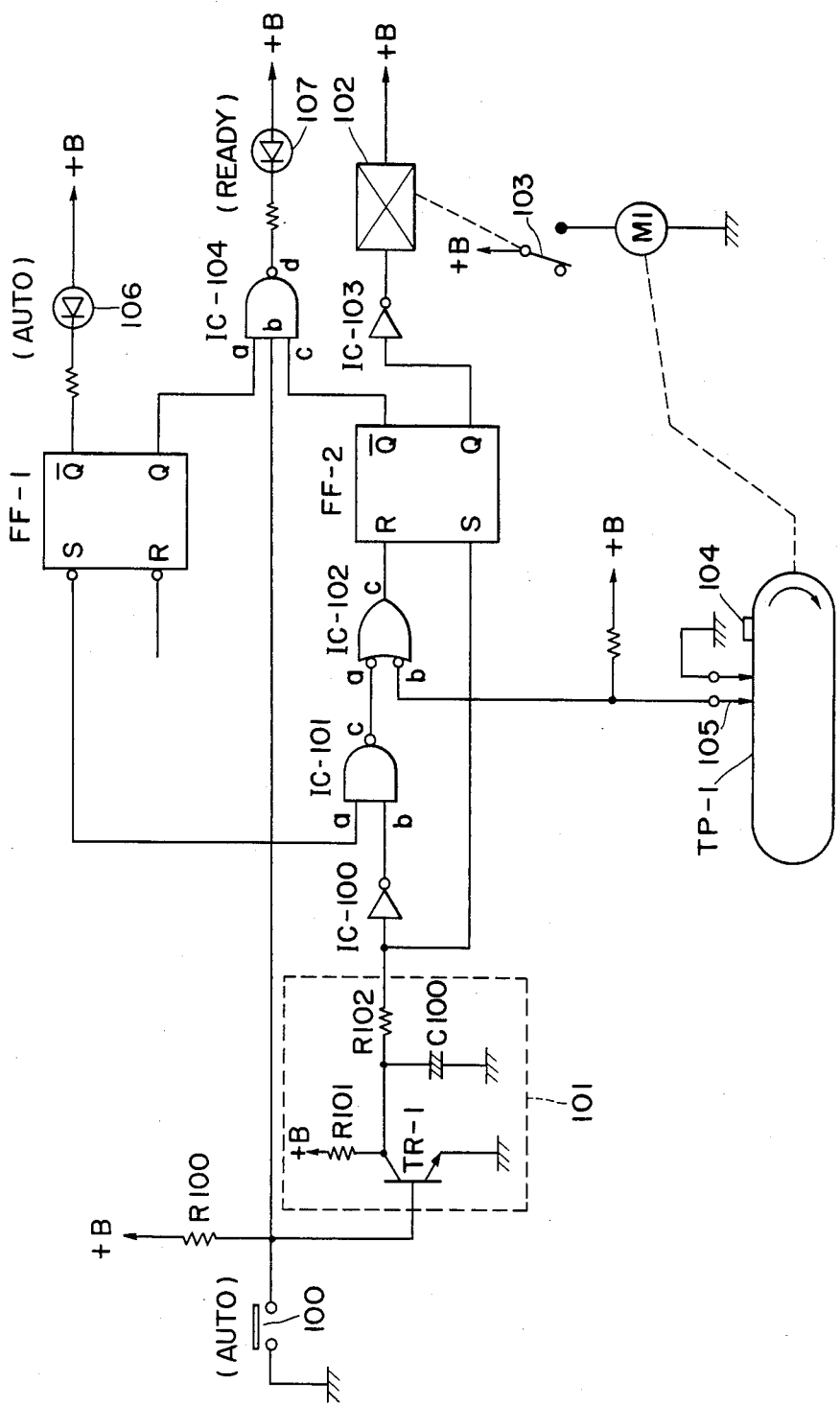
FIG. 4 is the main part of a circuit diagram showing a second example of the present invention.

In FIG. 4, there is shown another example in which the CPU is not utilized. Referring to FIG. 4, 100 designates a key for setting the device to be automatically operated, 101 a delay circuit for producing an output when the key 100 is operated to be continuously pushed for more than one second, and FF-1 a flip-flop circuit wherein it is set by pushing the key 100 and also is reset by pushing a key which has another mode not shown in figures or by switching on a power source. Also, FF-2 designates a flip-flop circuit which is set by an output of the delay circuit 101, 102 a relay which is operated by an output of the flip-flop FF-2, 103 a contact of the relay 102, 104 a conductor foil attached to the starting point of the answer tape TP-1, the 105 an electrode.

Firstly, the case where the key 100 is continuously pushed for more than one second will be explained hereinafter. Since the pushing of the key 100 causes the set terminal S of the flip-flop FF-1 to be on an L-level, the flip-flop FF-1 is set and the terminal $\bar{Q}$ thereof is switched from H-level to L-level. As a result, an electroluminescent diode 106 lights up and indicates that it is now in an automatic operation mode. At the same time, the terminal a of the NAND gate IC-104 is raised up to H-level through the terminal Q thereof, and also the base of the transistor TR-1 is connected to the ground through the key 100. Accordingly, the transistor TR-1 which has been set to be an on-state by means of a resistor R100 is switched to an off-state thereby to start charging of a capacitor C100 through a resistor R101. When, after almost when second, the charged voltage of the capacitor C100 reaches a predetermined value, the terminal b of a NAND gate IC-101 is brought down from H-level to L-level through a resistor R102 and an inverter IC-100. Consequently, the terminal c of the NAND gate IC-101 is switched to L-level and the reset terminal R of a flip-flop FF-2 is also switched from L-level to H-level through a NOR gate IC-102 thereby to release the reset state of the flip-flop FF-2. On the other hand, the charged voltage of the capacitor C100 causes the set terminal S of the flip-flop FF-2 to be switched from L-level to H-level whereby the flip-flop FF-2 is set.

At this state, the terminal $\bar{Q}$ of the flip-flop FF-2 is switched from H-level to L-level and an electroluminescent diode (READY) 107, as will be explained hereinafter, does not light up until the answer tape TP-1 completes one round. At the same time, when the terminal Q of the flip-flop FF-2 is switched to H-level, it causes a relay 102 to be operated through a driver IC-103 whereby the motor M1 is driven through the contact 103 of the relay 102 and the answer tape TP-1 runs in the direction indicated by an arrow. Thus, after the answer tape TP-1 starts, the finger of an operator is detached from the key 100, and the answer messages which have been, beforehand, recorded are reproduced through a reproducing circuit not shown in figures.

Since, when a conductor foil 104 contacts with an electrode 105 after the running of one round of the answer tape TP-1, the contact mentioned above makes the flip-flop FF-2 reset through the terminals b and c of the NOR gate IC-102, the answer tape TP-1, as is clear from the above descriptions, stop running. At the same time, when the terminal $\bar{Q}$ of the flip-flop FF-2 returns to H-level, the terminal Q of the NAND gate IC-104 is switched to H-level and also other terminals b and c thereof have been already switched to H-level. Therefore, the terminal d is switched to L-level whereby an electroluminescent diode (READY) 107 lights up and it is indicated that a standby state has been completely established. In addition, the output of the terminal d of the NAND gate IC-104 is utilized to make the detecting circuit of a calling signal active.

Secondly, in the case where the key 100 is detached from the finger of an operator within one second, it is clear that the flip-flop FF-2 is not set and the terminal c of the NAND gate keeps H-level. Accordingly, when the key 100 is detached therefrom within one second, the terminal b of the NAND gate IC-104 is switched to H-level and the electroluminescent diode 107 lights up without the running of the answer tape TP-1, indicating that a standby state has been established.

Thus, the present invention provides an automatic telephone recording device in which at the time of preparing programs for each operating means of an automatic telephone answering device which is controlled by a micro-computer, a standby state is established without running of one round of the answer tape in accordance with the manner of pushing an "absent" button, namely, the length of time for pushing the button. In this case, the micro-computer control may be substituted for a relay control, and accordingly the device according to the present invention may be applied for any conventional automatic telephone answering devices which are controlled by a micro-computer or a relay.

In addition, although a magnetic tape was used to record incoming messages in the example mentioned above, it may be proposed in the future that they will be recorded by a solid state recording system without using the magnetic tape. In this case, it goes without saying that the present invention will be applicable thereto and also it does not necessitate to set the lead of a tape. In this case, it will be effected in accordance with the manner of pushing an "absent" button to select whether a standby state will be established immediately after the start of a solid recording, or a standby state will be obtained after messages which have been recorded by a solid state recording are produced once and also the confirmation is completed.

It will be understood that the modification disclosed herein may be made within the scope of claims without departing from the spirit of the invention.

What is claimed is:

1. An automatic telephone answering and recording device which is so organized that after, upon receipt of a calling signal from a calling party, a closed circuit is formed, previously recorded outgoing messages are sent to the calling party and the incoming messages of the calling party are recorded, wherein the device includes means for measuring a length of time of pushing of an "absent" button by a user, and is capable of selecting, in accordance with said length of time measured by said measuring means, a case wherein after the pushed "absent" button is released, a recording medium runs automatically, once, for the confirmation of messages and then the device is set to be on standby, or a case wherein after the "absent" button is released, the device is set to be on standby without automatic running thereof.

2. An automatic telephone recording device as defined in claim 1 wherein said selecting operation of either of said standby states is carried out in accordance with the length of a current flowing time of a relay or a control circuit equivalent thereto.

3. An automatic telephone recording device as defined in claim 1, wherein said recording medium comprises a magnetic tape.

4. An automatic telephone answering and recording device which is so organized that after, upon receipt of a calling signal from a calling party, a closed circuit is formed, previously recorded outgoing messages are sent to the calling party and the incoming messages of the calling party are recorded, wherein the device is capable of selecting, in accordance with a length of time for pushing an "absent" button, a case wherein after the pushed "absent" button is released a recording medium runs automatically, once, for the confirmation of the messages and then the device is set to be on standby, or a case wherein after the pushed "absent" button is released the device is set to be on standby without automatic running thereof; and wherein said device is provided with a microcomputer which includes a predetermined program and said selecting operation of either of said standby states is carried out in accordance with said length of time, measured by said program, of pushing the "absent" button.

5. An automatic telephone answering and recording device comprising:

means for forming a closed circuit upon receipt of a calling signal from a calling party;

means for playing back a previously recorded outgoing message to the calling party;

means for recording incoming messages of the calling party;

means for measuring a length of time that an "absent" button is operated after said button is pushed by a user; and means for selecting between (a) a standby mode after "automatic running" and (b) a standby mode awaiting incoming calls without "automatic running", wherein said standby mode without "automatic running" causes an outgoing message recording medium to operate automatically, once, for the confirmation of the outgoing messages, and then sets the device to be on standby, and wherein either said mode (a) or (b) is selected in accordance with said length of time measured by said measuring means.

6. An automatic telephone recording device as defined in claim 5, wherein said recording medium comprises a magnetic tape.

7. An automatic telephone answering and recording device operative in different operating modes and having a function button for selecting said modes, the device comprising:

means responsive to a receipt of a calling signal from a calling party for forming a closed circuit;

means for playing back a previously recorded outgoing message to the calling party;

means for recording incoming messages of the calling party; and means for selecting among said different modes of operation of said device, including a microcomputer programmed to measure a time duration that said function button is pushed and, in response to select a particular mode of operation.

* * * * *